(12) United States Patent
Pechanec et al.

(10) Patent No.: US 9,785,289 B2
(45) Date of Patent: Oct. 10, 2017

(54) GUI CONTROL IMPROVEMENT USING A CAPACITIVE TOUCH SCREEN

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 913 days.

(21) Appl. No.: 12/952,700

(22) Filed: Nov. 23, 2010

(65) Prior Publication Data

US 2012/0131453 A1 May 24, 2012

(51) Int. Cl.
*G06F 3/041* (2006.01)
*G06F 3/044* (2006.01)
*G06F 3/0484* (2013.01)
*G06F 3/0488* (2013.01)

(52) U.S. Cl.
CPC .......... *G06F 3/044* (2013.01); *G06F 3/04842* (2013.01); *G06F 3/04883* (2013.01); *G06F 2203/04805* (2013.01)

(58) Field of Classification Search
None
See application file for complete search history.

(56) References Cited

U.S. PATENT DOCUMENTS

| | | |
|---|---|---|
| 2008/0094368 A1 | 4/2008 | Ording et al. |
| 2008/0122796 A1 | 5/2008 | Jobs et al. |
| 2008/0165148 A1 | 7/2008 | Williamson et al. |
| 2008/0303799 A1* | 12/2008 | Schwesig .............. G06F 3/0414 345/173 |
| 2009/0315848 A1* | 12/2009 | Ku et al. ........................ 345/173 |
| 2010/0060597 A1 | 3/2010 | Choi et al. |
| 2010/0162108 A1* | 6/2010 | Stallings .............. G06F 3/04817 715/702 |
| 2011/0083104 A1* | 4/2011 | Minton ............... G06F 3/04886 715/815 |
| 2011/0120784 A1* | 5/2011 | Osoinach et al. ......... 178/18.06 |
| 2012/0188285 A1* | 7/2012 | Friedlander ........... G06F 1/3203 345/660 |
| 2013/0125068 A1* | 5/2013 | Harris et al. .................. 715/863 |

* cited by examiner

*Primary Examiner* — Tuan S Nguyen
(74) *Attorney, Agent, or Firm* — Lowenstein Sandler LLP

(57) ABSTRACT

A system includes a processing device, a touch screen display, a memory coupled to the processing device and a graphical user interface (GUI) control module, executed from the processor and the memory. The GUI control module identifies a control element displayed on the touch screen display near a location of a conductive object near a surface of the touch screen display, where the conductive object is not in physical contact with the surface, and enlarges the control element.

17 Claims, 5 Drawing Sheets

GUI CONTROL IMPROVEMENT USING A CAPACITIVE TOUCH SCREEN

TECHNICAL FIELD

This disclosure relates to the field of user interfaces and, in particular, to improved control of a graphical user interface using a capacitive touch screen.

BACKGROUND

Certain touch sensor devices operate by way of capacitance sensing utilizing capacitance sensors. The capacitance detected by a capacitance sensor changes as a function of the proximity of a conductive object to the sensor. The conductive object can be, for example, a stylus or a user's finger. In a touch sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch sensor pad or touch sensor screen in the X and Y dimensions.

One type of touch sensor device is a capacitive touch screen. A capacitive touch screen is an electronic visual display that can detect the presence and location of a touch within the display area. A touch screen enables one to interact directly with what is displayed, rather than indirectly with a cursor controlled by a mouse or touchpad. The touch screen lets a user do so without requiring any intermediate device that would need to be held in the hand (e.g., a stylus, although touch screens may be able to function with a stylus). Such displays can be attached to computers, or to networks as terminals. They also play a prominent role in the design of digital appliances such as the personal digital assistant (PDA), satellite navigation devices, mobile phones, and video games.

A touch screen may display an image generated by a program running on the computing device implementing the touch screen. The image may include one or more controls which a user may interact with in order to cause the program to perform corresponding actions. The controls may include, for example, an icon that the user selects by pressing the touch screen with a finger in the location where the icon is displayed. In the case where a number of controls are condensed into a relatively small area on the touch screen, or where the controls themselves are smaller than the fingertip of a user, it may be difficult for the user to accurately select the desired control. For example a user may press an area on the touch screen that overlaps more than one control, possibly resulting in the selection of an unintended control.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described to improve control in a graphical user interface (GUI) using a capacitive touch screen. In one embodiment, a program running on a computing device displays an image on a capacitive touch screen. The image may include one or more controls, the locations of which are known by a touch screen display driver. A user may interact with the controls by pressing the touch screen with a finger or other conductive object in the location where the control is displayed in order to cause the program to perform a corresponding action. A capacitive sensor module in the computing device may detect when the conductive object is hovered near the surface of the touch screen, but is not physically in contact. A GUI control module may enlarge one or more controls on the touch screen, in the area of the conductive object, in order to allow the user to more precisely select a desired control.

The capacitive sensor module can detect the location of the conductive object by measuring a change in capacitance of one or more capacitive sensors that make up an array covering the surface of the touch screen. The GUI control module receives this location of the conductive object and compares the location to the known locations of the controls on the touch screen display. The locations of the controls may be received from the touch screen display driver. If there are any controls displayed near the location of the conductive object, GUI control module causes those controls to be enlarged on the touch screen display. Depending on the embodiment, only the controls themselves may be enlarged, or the entire area within a predefined distance of the location of the conductive object may be enlarged.

Figure 1:
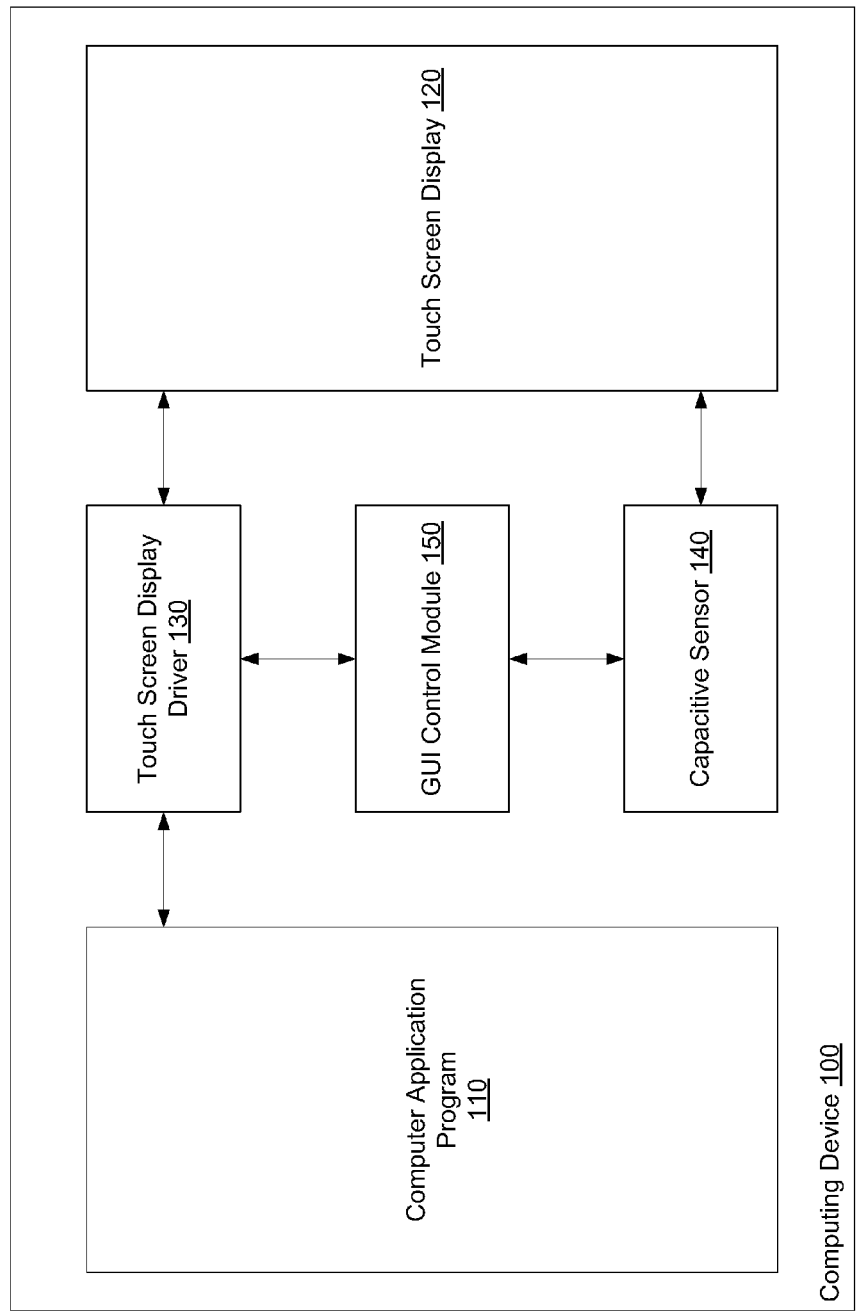
FIG. 1 is a block diagram illustrating a computing device to implement improved GUI control, according to an embodiment.

FIG. 1 is a block diagram illustrating a computing device to implement improved GUI control, according to an embodiment of the present invention. In one embodiment, computing device 100 includes a computer application program 110, which performs one or more computer implemented functions. Computer application program 110 may implement the functionality of a word processing program, spreadsheet program, email program, chat program, web browser or other program. In one embodiment, computer application program 110 may be part of an operating system running on computing device 100. Embodiments of the improved GUI control described herein may work with any computer application program running on computing device 100.

A user may interact with computer application program 110 through touch screen display 120. In one embodiment, touch screen display 120 may be a capacitive-sensing touch screen configured to display GUIs generated by computer application program 110 and detect input from a change in capacitance due to the proximity of a conductive object. The conductive object may be, for example, a user's finger, a stylus made from conductive materials, or other conductive object. Computer application program 110 may provide instructions on the GUIs to touch screen display driver 130, which displays the GUI on touch screen display 120. The displayed GUI may include one or more control elements which the user may interact with (e.g., by touching a corresponding area on touch screen display 120). The controls may cause computer application program 110 to perform predefined actions. Touch screen display driver 130 displays the one or more controls in a known location on touch screen display 120. For example, touch screen display driver 130 may use a system of X and Y coordinates to determine the location where the controls are displayed. Touch screen display driver 130 may store the coordinate location of each of the one or more controls in a storage device of computing device 100 for access by other software modules, as will be further described below.

In one embodiment, touch screen display 120 may include one or more sets of sensor elements that are disposed in at least one dimension of the touch sensor display 120. These sensor elements form a sensor array configured to detect the location of capacitive object on or near the surface of touch screen display 120. In one embodiment, sets of sensor elements are arranged in both the X and Y dimensions forming a two-dimensional sensor grid array. In other embodiments, the sensor elements may be arranged in any other fashion.

Each set of sensor elements in touch screen display 120 is connected to capacitive sensor module 140. In one embodiment capacitive sensor module 140 includes a selection circuit (not shown). The selection circuit may be used to select which of the multiple sensor elements should provide a charge current and measure the capacitance of each sensor element. Based on a change in capacitance of certain sensor elements, capacitive sensor module 140 may detect the presence of a conductive object (e.g., a user's finger) on or near the surface of touch screen display 120. Additional details of the detection of a conductive object are provided below with respect to FIG. 2. Various known circuitry may be used to implement capacitance sensor module 140 for detection of capacitive sensor activation. For example, such detection may be performed utilizing a capacitive switch relaxation oscillator (CSR). The CSR may be coupled to an array of sensor elements using a current-programmable relaxation oscillator, an analog multiplexer, digital counting functions, and high-level software routines. It should be noted that there are various known methods for measuring capacitance with a capacitance sensor. The present embodiments are not limited to using relaxation oscillators, but may include other methods known in the art, such as current versus voltage phase shift measurement, resistor-capacitor charge timing, capacitive bridge divider, charge transfer, sigma-delta modulators, charge-accumulation circuits, or the like. Additional details regarding these alternative embodiments are not included so as to not obscure the present embodiments, and because these alternative embodiments for measuring capacitance are known by those of ordinary skill in the art.

Computing device 100 may additionally include GUI control module 150. In one embodiment GUI control module 150 is operable to communicate with touch screen display driver 130 and with capacitive sensor module 140. When capacitive sensor module 140 detects the presence of a conductive object near (i.e., within a certain range, but not physically in contact with) touch screen display 120, capacitive sensor module identifies a location of the conductive object in relation to the display 120 and provides the location to GUI control module 150. GUI control module 150 receives the location information of any controls currently displayed on touch screen display 120 from touch screen display driver 130. GUI control module 150 compares the location of the conductive object to the list of displayed controls and determines which controls are within a predefined distance from the location of the conductive object. GUI control module 150 invokes touch screen display driver to enlarge those controls within the predefined distance. As will be described below with respect to FIGS. 3A-3C, only the controls themselves may be enlarged, or the entire area within the predefined distance may be enlarged. The enlargement of the controls allows the user to more easily and accurately select one of the controls by making contact with touch screen display 120 in the location where the control element is displayed.

Figure 2:
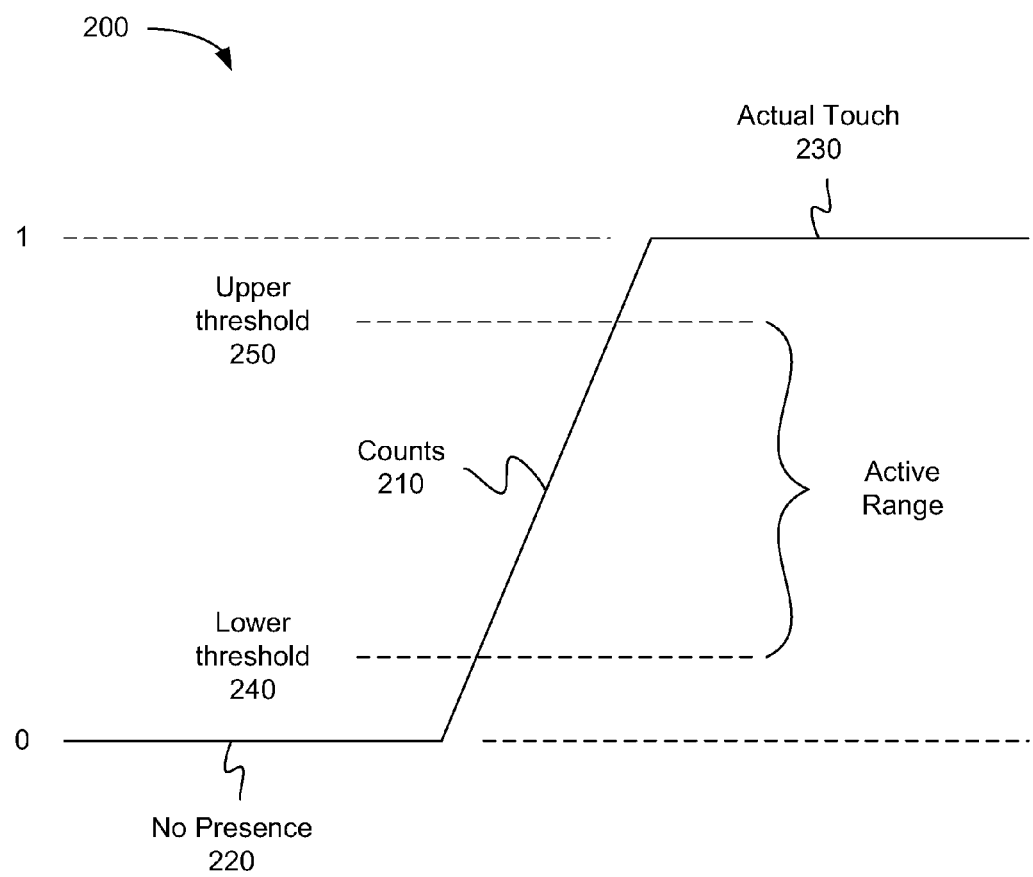
FIG. 2 illustrates a graph of a difference count of a single sensor element according to an embodiment.

FIG. 2 illustrates a graph 200 of a difference count of a single sensor element. The sensor element may be one of the elements forming the sensor array of touch screen display 120 in FIG. 1. At startup (or boot) of a touch sensor array, the sensor elements of a touch sensor array are scanned and the count values for each sensor element with no activation are stored as a baseline value. The presence of a finger or conductive object on a sensor element is determined by the difference in counts between a stored value for no sensor element activation and an acquired value with sensor element activation, referred to as a difference count.

Graph 200 includes the counts 210 as measured on a single sensor element. For "no presence" 220 on the sensor element, the count value may be zero. Alternatively, "no presence" 220 may have a count value other than zero, where such capacitance may be referred to as a baseline capacitance and is attributable to other elements in the computing device. In either case, "no presence" 220 is representative of the case where no finger or other conductive object is on or near the touch screen. "No presence" 220 may be configured to be detected below a noise threshold (not shown), where as long as the counts 210 are measured as being below the noise threshold, the sensing device detects "no presence". For "actual touch" 230 on the sensor element, the count value may be equal to one. "Actual touch" 230 is when the sensing device detects the presence of the conductive object (e.g., finger) actually touching the sensor element. In one embodiment, actual touch 230 is detected when the counts 210 are greater than a presence threshold (not shown). The presence threshold may be used to include a design margin in determining that a presence of a conductive object is detected on the sensing element.

In one embodiment of the present invention, GUI control module 150 causes certain controls displayed on touch screen display 120 to be enlarged when a user's finger is hovered near, but not touching, the surface of touch screen display 120. Thus, capacitive sensor module 140 may be preprogrammed with difference count thresholds to define the range in which GUI control module 150 is activated.

Since the difference count 210 will increase as the conductive object gets closer to the surface of touch screen display 120, lower threshold 240 may signify the activation of GUI control module 150. Thus, when the conductive object gets close enough to cause the difference count value 210 to reach lower threshold 240, capacitive sensor module 140 may send an activation signal to GUI control module 150. Similarly when the difference count value 210 reaches an upper threshold 250, capacitive sensor module 140 may send a deactivation signal to GUI control module 150. In one embodiment, the upper threshold 250 may be equal to "actual touch" 230. This causes the control enlargement function implemented by GUI control module 150 to be turned off when the conductive object makes physical contact with the surface of touch screen display 120.

Figure 3A:
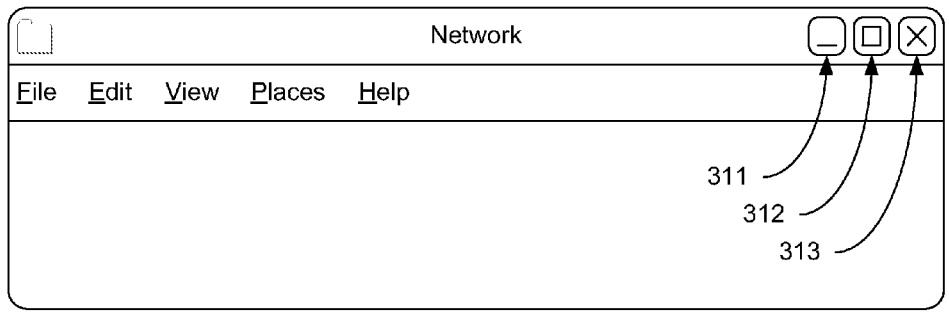
FIGS. 3A-3C illustrate application windows where improved GUI control may be implemented, according to an embodiment.
Figure 3B:
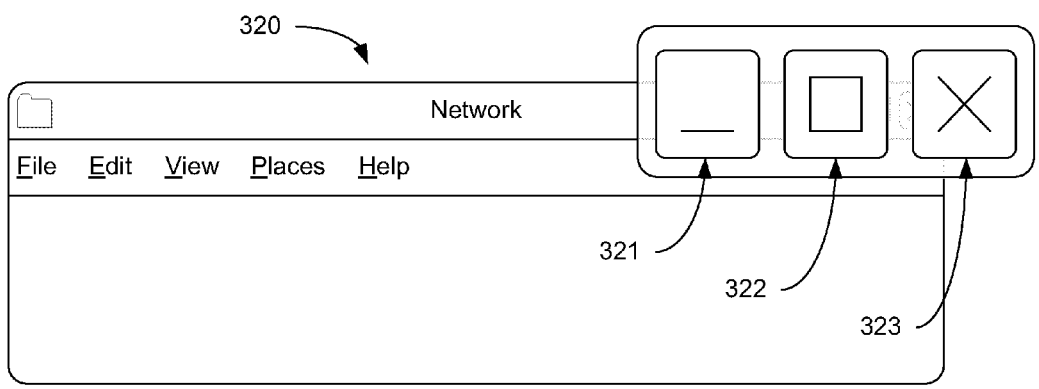
Figure 3C:
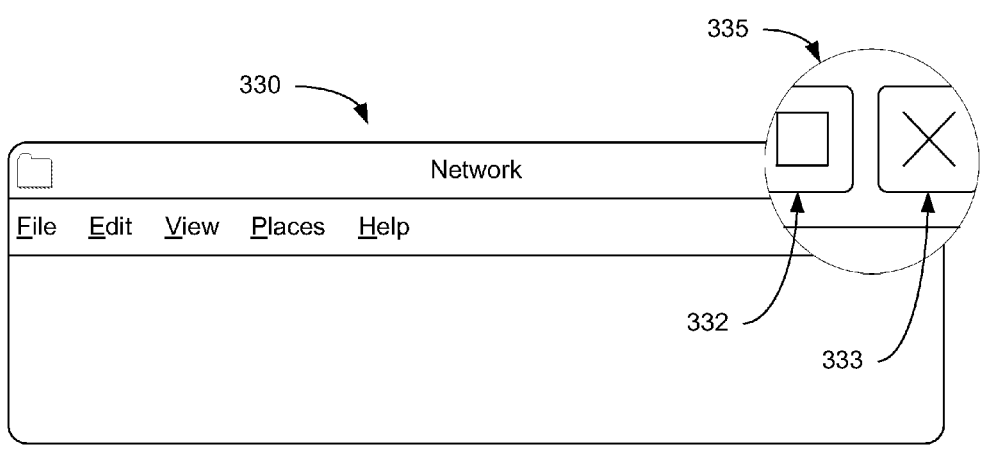

FIGS. 3A-3C illustrate exemplary application windows where improved GUI control may be implemented, according to an embodiment of the present invention. In FIG. 3A, window 310 may be one example of a GUI displayed by computer application program 110 on touch screen display 120. In this embodiment, window 310 includes a number of control elements, including control buttons 311, 312, 313. When selected, these control buttons cause computer application program 110 to perform different functions relating to control of the window 310, such as minimizing (311), maximizing (312) and closing (313). These control buttons are merely examples of one type of control and should not be construed as limiting in any way. In other embodiments, window 310 may include any other number and/or type of control elements.

In FIG. 3A, control buttons 311, 312, 313 are relatively small in relation to the size of touch screen display 120 and are located in close proximity to one another. This may make it difficult for a user to accurately select one of the controls (e.g., button 313) without accidentally selecting a different control (e.g., button 312). The GUI control improvement techniques described herein allow for more precise selection of a desired control. As seen in FIGS. 3B and 3C, if a conductive object (e.g., a user's finger) is hovered near control buttons 311, 312, 313, the controls may be enlarged to make selection of the desired control easier for the user.

FIG. 3B illustrates a window 320 where the controls have been enlarged. In this embodiment, capacitive sensor 140 detects a conductive object hovered over touch screen display 120 at a location near the controls. GUI control module 150 identifies the controls near the location of the conductive object and provides instructions to touch screen display driver 130 to enlarge the controls. In this embodiment, controls 321, 322, 323 are enlarged. In one embodiment, touch screen display driver 130 may provide an application programming interface (API) which GUI control module 150 can call. GUI control module 150 may provide an identifier of the controls to be enlarged with the API call and, in response, touch screen display driver 130 may enlarge the identified controls.

FIG. 3C illustrates a window 330 where an area 335 near the location of a detected conductive object has been enlarged. In this embodiment, rather than enlarge only the controls, as shown in FIG. 3B, GUI control module 150 provides instructions to touch screen display driver 130 to enlarge an area 335 within a specified distance from the location of the detected conductive object. The enlargement may be a magnification of the entire area 335, which in this case, includes controls 332, 333. In one embodiment, GUI control module 150 may call the API provided by touch screen display driver 130. GUI control module 150 may provide a location (i.e., the detected location of the conductive object) with the API call and, in response, touch screen display driver 130 may enlarge the display within a predefined distance of the location.

In window 310, each of controls 311, 312, 313 may cover an area of touch screen display 120 having one or more capacitive sensors. Thus, the detection of a touch on any of the one or more capacitive sensors may indicate a selection of the corresponding control. Touch screen display driver 130 maintains a database or other memory structure with the mapping information for which capacitive sensors correspond to each control. When the controls are enlarged, as in windows 320 and 330, the controls may cover an area of touch screen display 120 having more and/or different capacitive sensors. Upon enlarging the controls, touch screen display driver 130 updates the mapping information so that a touch of an area of touch screen display 120 in an area corresponding to an enlarged control may be registered as a selection of that enlarged control. Touch screen display driver 130 notifies computer application program 110 of the selection so that computer application program 110 may take appropriate action.

Figure 4:
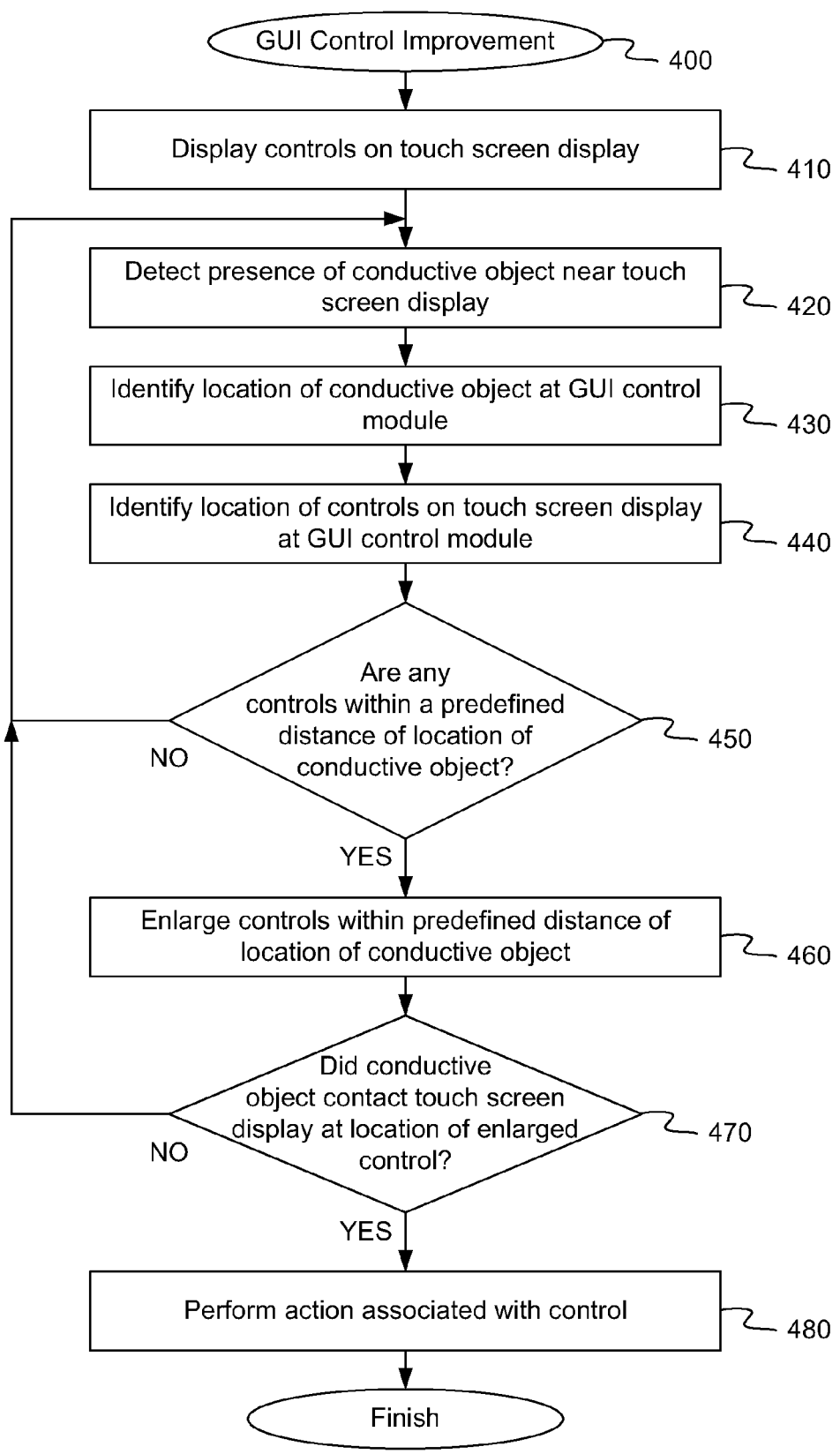
FIG. 4 is a flow diagram illustrating a GUI control improvement method, according to an embodiment.

FIG. 4 is a flow diagram illustrating a GUI control improvement method, according to an embodiment of the present invention. The method 400 may be performed by processing logic that comprises hardware (e.g., circuitry, dedicated logic, programmable logic, microcode, etc.), software (e.g., instructions run on a processing device to perform hardware simulation), or a combination thereof. The processing logic is configured to provide an interactive input method to efficiently receive user input in a language where the number of characters is greater than the number of keys on a keyboard. In one embodiment, method 400 may be performed by computing device 100, as shown in FIG. 1.

Referring to FIG. 4, at block 410, method 400 displays a GUI, including one or more control elements, on a touch screen display. In one embodiment touch screen display driver 130 receives instructions from computer application program 110 running on computing device 100 for a GUI to be displayed. The control elements are displayed within the GUI at a location defined, for example, by an X-Y coordinate system. In other embodiments, some other system may be used to identify the location of the controls in the GUI.

At block 420, method 400 detects the presence of a conductive object near the surface of touch screen display 120. Capacitive sensor module 140 scans the sensor elements that make up a sensor array in touch screen display 120 to detect a change in capacitance attributable to the presence of a conductive object (i.e., a user's finger). Each sensor element generates a sensor element signal representative of a difference count 210 for the sensor element. Capacitive sensor module 140 measures the difference count 210 of the sensor elements and identifies one or more sensors where the difference count 210 is between a lower threshold 240 and an upper threshold 250. When the difference count 210 is between the thresholds, it indicates that the conductive object is near, but not physically touching, the surface of touch screen display 120. This situation may occur, when the user is hovering a finger above the touch screen display 120.

At block 430, method 400 identifies a location of the conductive object at GUI control module 150. Capacitive sensor module 140 may determine the location of the conductive object by scanning the various rows and columns of sensor elements that make up the sensor array in touch screen display 120. By identifying the sensor or sensors where the difference count is in the region defined by the upper and lower thresholds, capacitive sensor module 140 can determine where the conductive object is in relation to the touch screen display 120. Capacitive sensor module 140 provides the location of the conductive object to GUI control module 150.

At block 440, method 400 identifies the locations of one or more control elements displayed on touch screen display 120 at GUI control module 150. As discussed above, touch screen display driver 130 maps the position of each control in an X-Y or other coordinate system. Touch screen display driver 130 provides the locations of each control to GUI control module 150.

At block 450, method 400 determines whether there are any controls displayed on touch screen display 120 within a predefined distance of the location of the conductive object. In one embodiment, GUI control module 150 compares the location of the conductive object identified at block 430 to the list of locations of the displayed control elements identified at block 440. GUI control module 150 may be programmed with a predefined distance which serves as a threshold for determining a match as a result of the comparison. GUI control module 150 compares the location of the conductive object to a location of the control elements and determines a distance between the location of the conductive object and the location of the control elements. GUI control module 150 determines whether that distance is less than a predefined distance threshold. In one embodiment, the predefined distance threshold may be a distance of two centimeters, however, in other embodiments, any other predefined distance may be used. The predefined distance threshold may be a configurable option set by the user of computing device 100 or may be a preprogrammed default value. GUI control module 150 may have knowledge of the size and relative distances of touch screen display 120 so that it may convert the two locations identified, for example, on an X-Y coordinate system, to a measured distance (e.g., centimeters) and vice versa.

If at block 450, method 400 determines that there is at least one control within the predefined distance from the location of the conductive object, at block 460 method 400 enlarges the control(s). As discussed above with respect to FIGS. 3A-3C, only the controls themselves may be enlarged, or the entire area within the predefined distance may be enlarged. When the controls are enlarged, touch screen display driver 130 renders the controls to have a larger size on touch screen display 120 and to cover more sensor elements in the array of sensor elements in the touch screen display 120. Alternatively, when the controls are enlarged touch screen display driver 130 may magnify an entire area of the touch screen display 120 within a predefined distance of the location of the conductive object. This predefined distance may be the same or different than the predefined distance used to determine if a control element is near the location of the conductive object at block 450. If at block 450, method 400 determines that there are not any controls within the predefined distance, method 400 returns to block 420 and waits to detect the presence of a conductive object in another location.

With the controls having been enlarged, at block 470, method 400 determines whether the conductive object makes physical contact with the touch screen display 120 at a location of an enlarged control. Capacitive sensor module 140 may detect an "actual touch" 230 when the difference count reaches a defined touch threshold. Capacitive sensor module 140 provides the location of the "actual touch" 230 to GUI control module 150, which compares the location of the touch to the locations of the enlarged controls. As discussed above with respect to FIGS. 3A-3C, the locations of the enlarged controls may be different than the locations of the controls as originally displayed on touch screen display 120. GUI control module 150 determines that the conductive object contacted the touch screen, thus selecting a control, when the location of the contact with touch screen display 120 falls within an area defined as the location of the enlarged control.

If at block 470, method 400 determines that the conductive object contacted the touch screen display 120 at the location of the enlarged control, at block 480 method 400 performs an action associated with the control element. Computer application program 110 may have one or more actions associated with the activation of a control element and may perform the action accordingly. If at block 470, method 400 determines that the conductive object does not contact the touch screen display 120, method 400 returns to block 420 and waits to detect the presence of a conductive objet in another location.

Figure 5:
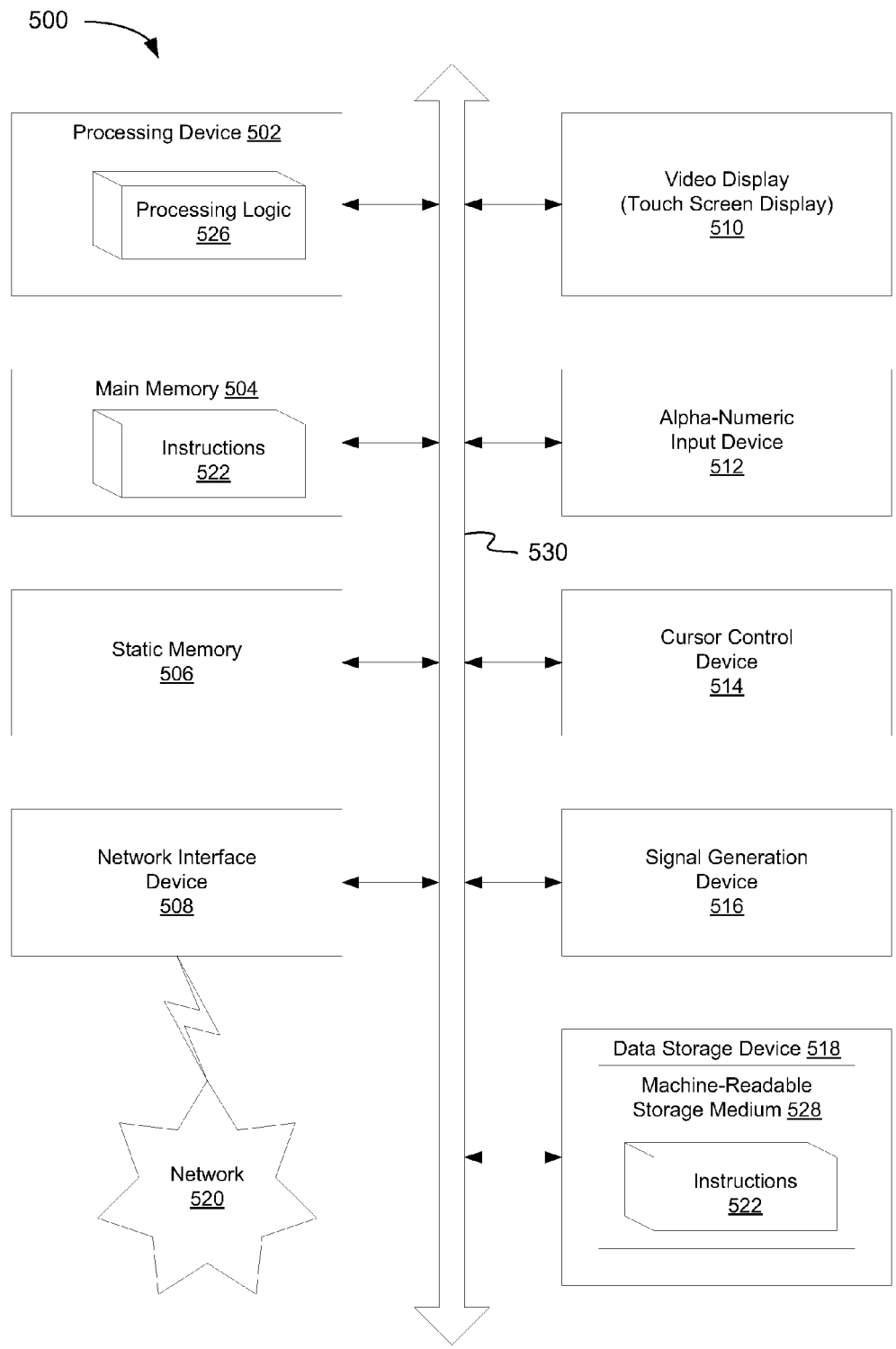
FIG. 5 is a block diagram illustrating one embodiment of a computer system, according to an embodiment.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker). In one embodiment, video display unit 510 is a touch screen display device, such as touch screen display 120 described above with respect to FIG. 1.

The data storage device 518 may include a machine-accessible storage medium 528, on which is stored one or more set of instructions 522 (e.g., software) embodying any one or more of the methodologies of functions described herein. The instructions 522 may also reside, completely or at least partially, within the main memory 504 and/or within the processing device 502 during execution thereof by the computer system 500; the main memory 504 and the processing device 502 also constituting machine-accessible storage media. The instructions 522 may further be transmitted or received over a network 520 via the network interface device 508.

The machine-readable storage medium 528 may also be used to store instructions to perform a method 400 to improve GUI control, and/or a software library containing methods that call the above applications. While the machine-readable storage medium 528 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A method, comprising:
    scanning an array of capacitive sensors in a touch screen display, during startup of the touch screen display, and storing baseline count values for each capacitive sensor in the array of capacitive sensors;
    detecting a presence of a conductive object near a surface of the touch screen display, wherein the conductive object is not in physical contact with the surface, wherein detecting comprises scanning the array of capacitive sensors in the touch screen display to determine new count values for each capacitive sensor in the array of capacitive sensors, wherein a difference between the new count values and the baseline count values determines a location of the conductive object on the touch screen display and a distance of the conductive object from the surface of the touch screen display;
    identifying, by a processing device, a control element, wherein the control element is displayed on the touch screen display within a predefined distance of the location of the conductive object on the touch screen display, wherein the control element is initially mapped to a first set of capacitive sensors from the array of capacitive sensors, and wherein the predefined distance of the location of the conductive object, within which the control element is displayed on the touch screen display is a configurable option;
    enlarging the control element in view of the identifying, wherein the enlarging comprises mapping the control element to a second set of capacitive sensors including at least one additional capacitive sensor not included in the first set of capacitive sensors; and
    updating a data structure comprising mapping information associated with the control element.

2. The method of claim 1, wherein the conductive object is near the surface of the touch screen when the difference between the new count values and the baseline count values is between a lower threshold and an upper threshold.

3. The method of claim 1, wherein identifying a control element comprises:
    comparing the location of the conductive object to a location of the control element;
    determining a distance between the location of the conductive object and the location of the control element; and
    determining whether the distance is less than a predefined distance threshold.

4. The method of claim 1, wherein enlarging the control element further comprises rendering the control element to have a larger size on the touch screen display.

5. The method of claim 1, wherein enlarging the control element further comprises magnifying an entire area of the touch screen display within a predefined distance of the location of the conductive object.

6. The method of claim 1, further comprising:
    detecting that the conductive object makes contact with the surface of the touch screen display in an area where the enlarged control element is displayed; and
    performing an action associated with the control element.

7. A system comprising:
    a memory;
    a touch screen display;
    a touch screen display driver; and
    a processing device, operatively coupled to the memory, the processing device to:
        scan an array of capacitive sensors in the touch screen display, during startup of the touch screen display, and store baseline count values for each capacitive sensor in the array of capacitive sensors;
        detect a presence of a conductive object near a surface of the touch screen display, wherein the conductive object is not in physical contact with the surface, wherein detecting comprises scanning the array of capacitive sensors in the touch screen display to determine new count values for each capacitive sensor in the array of capacitive sensors, wherein a difference between the new count values and the baseline count values determines a location of the conductive object on the touch screen display and a distance of the conductive object from the surface of the touch screen display;

identify a control element, wherein the control element is displayed on the touch screen within a predefined distance of the location of the conductive object on the touch screen display, wherein the control element is initially mapped to a first set of capacitive sensors from the array of capacitive sensors, and wherein the predefined di distance of the location of the conductive object, within which the control element is displayed on the touch screen display is a configurable option;

enlarge the control element in view of the identifying, wherein the enlarging comprises mapping the control element to a second set of capacitive sensors including at least one additional capacitive sensor not included in the first set of capacitive sensors; and update a data structure comprising mapping information associated with the control element.

8. The system of claim 7, wherein the conductive object is near the surface of the touch screen when difference between the new count values and the baseline count values is between a lower threshold and an upper threshold.

9. The system of claim 7, wherein the processing device further to:
compare the location of the conductive object to a location of the control element;
determine a distance between the location of the conductive object and the location of the control element; and
determine whether the distance is less than a predefined distance threshold.

10. The system of claim 7, wherein to enlarge the control element, the processing device to send a signal to the touch screen display driver to render the control element to have a larger size on the touch screen display and to cover more capacitive sensors in the array of capacitive sensors in the touch screen display.

11. The system of claim 7, wherein to enlarge the control element, the processing device to send a signal to the touch screen display driver to magnify an entire area of the touch screen display within a predefined distance of the location of the conductive object.

12. The system of claim 7, wherein the processing device further to:
detect that the conductive object makes contact with the surface of the touch screen display in an area where the enlarged control element is displayed; and
send a signal to an application program to perform an action associated with the control element.

13. A non-transitory machine readable storage medium storing instructions which when executed cause a processing device to:
scan an array of capacitive sensors in the touch screen display, during startup of the touch screen display, and store baseline count values for each capacitive sensor in the array of capacitive sensors;

detect a presence of a conductive object near a surface of the touch screen display, wherein the conductive object is not in physical contact with the surface, wherein detecting comprises scanning the array of capacitive sensors in the touch screen display to determine new count values for each capacitive sensor in the array of capacitive sensors, wherein a difference between the new count values and the baseline count values determines a location of the conductive object on the touch screen display and a distance of the conductive object from the surface of the touch screen display;

identify a control element, wherein the control element is displayed on the touch screen within a predefined distance of the location of the conductive object on the touch screen display, wherein the control element is initially mapped to a first set of capacitive sensors from the array of capacitive sensors, and wherein the predefined distance of the location of the conductive object, within which the control element is displayed on the touch screen display, is a configurable option;

enlarge the control element in view of the identifying, wherein the enlarging comprises mapping the control element to a second set of capacitive sensors including at least one additional capacitive sensor not included in the first set of capacitive sensors; and update a data structure comprising mapping information associated with the control element.

14. The storage medium of claim 13, wherein the conductive object is near the surface of the touch screen when the difference between the new count values and the baseline count values is between a lower threshold and an upper threshold.

15. The storage medium of claim 13, wherein to identify the control element, the instructions to cause the processing device to:
compare the location of the conductive object to a location of the control element;
determine a distance between the location of the conductive object and the location of the control element; and
determine whether the distance is less than a predefined distance threshold.

16. The storage medium of claim 13, wherein to enlarge the control element, the instructions to cause the processing device to render the control element to have a larger size on the touch screen display.

17. The storage medium of claim 13, wherein to enlarge the control element, the instructions to cause the processing device to magnify an entire area of the touch screen display within a predefined distance of the location of the conductive object.

* * * * *